United States Patent
Arima et al.

(10) Patent No.: US 10,414,443 B2
(45) Date of Patent: Sep. 17, 2019

(54) VEHICLE ATTACHMENT COMPONENT

(71) Applicant: DAIWA KASEI INDUSTRY CO., LTD., Aichi (JP)

(72) Inventors: Keisuke Arima, Aichi (JP); Haruhisa Kamiya, Aichi (JP); Takaaki Otoshi, Aichi (JP)

(73) Assignee: DAIWA KASEI INDUSTRY CO., LTD., Aichi (JP)

( * ) Notice: Subject to any disclaimer, the term of this patent is extended or adjusted under 35 U.S.C. 154(b) by 0 days.

(21) Appl. No.: 15/715,350

(22) Filed: Sep. 26, 2017

(65) Prior Publication Data

US 2018/0111645 A1 Apr. 26, 2018

(30) Foreign Application Priority Data

Oct. 21, 2016 (JP) .................................. 2016-206877

(51) Int. Cl.
*F16L 3/233* (2006.01)
*F16B 2/22* (2006.01)
(Continued)

(52) U.S. Cl.
CPC ........ *B62D 25/145* (2013.01); *B60R 16/0215* (2013.01); *B65D 63/1063* (2013.01);
(Continued)

(58) Field of Classification Search
USPC .................................. 248/74.3, 228.8, 230.8
See application file for complete search history.

(56) References Cited

U.S. PATENT DOCUMENTS 3,463,427 A * 8/1969 Fisher .................... F16L 3/2332
24/16 PB
4,700,913 A * 10/1987 Hirano ................ B60R 16/0215
24/543
(Continued)

FOREIGN PATENT DOCUMENTS

DE 102014201972 A1 8/2015
EP 2530028 A1 12/2012
(Continued)

OTHER PUBLICATIONS

Extended European Search Report issued in corresponding EP application No. EP 17194668.4 dated Feb. 1, 2018.

*Primary Examiner* — Alfred J Wujciak
(74) *Attorney, Agent, or Firm* — McClure, Qualey & Rodack, LLP

(57) ABSTRACT

The vehicle attachment component 1 is attached to an instrument panel reinforcement 100 so as to sandwich its thickness part between a detachment preventing engagement portion 21 engaged with the instrument panel reinforcement 100 from the deep side in the insertion direction and elastic pressing portions 20 protruding from the near side in the insertion direction of the detachment preventing engagement portion toward both sides in a direction 100Y perpendicular to the instrument panel reinforcement 100. The elastic pressing portions 20 have thin distal end portions 20A which always elastically press the instrument panel reinforcement 100, and thick base end portions 20B which withstand a load from the instrument panel reinforcement 100.

3 Claims, 11 Drawing Sheets

(51) Int. Cl.
  *B62D 25/14*  (2006.01)
  *F16B 2/08*   (2006.01)
  *B60R 16/02*  (2006.01)
  *B65D 63/10*  (2006.01)
  *F16B 21/08*  (2006.01)
  *H02G 3/32*   (2006.01)

(52) U.S. Cl.
  CPC .................. *F16B 2/08* (2013.01); *F16B 2/22* (2013.01); *F16B 21/086* (2013.01); *H02G 3/32* (2013.01); *B65D 63/1027* (2013.01); *F16L 3/233* (2013.01)

(56) References Cited

U.S. PATENT DOCUMENTS

| | | | | |
|---|---|---|---|---|
| 4,705,245 | A * | 11/1987 | Osada | F16L 3/233 24/16 PB |
| 5,584,452 | A * | 12/1996 | Koike | F16L 3/127 24/16 PB |
| 5,906,342 | A * | 5/1999 | Kraus | F16L 3/127 24/16 PB |
| 6,749,157 | B2 * | 6/2004 | Takeuchi | F16B 21/084 24/16 PB |
| D520,865 | S * | 5/2006 | Wakabayashi | D8/396 |
| 7,229,052 | B2 * | 6/2007 | Takeuchi | F16B 21/088 24/16 PB |
| 7,316,375 | B2 * | 1/2008 | Wakabayashi | B60R 16/0215 24/16 PB |
| 7,360,744 | B2 * | 4/2008 | Kwilosz | F16L 3/137 248/68.1 |
| 7,753,321 | B2 * | 7/2010 | Geiger | B60R 16/0215 248/68.1 |
| 2007/0284486 | A1 * | 12/2007 | Smutny | H02G 3/30 248/74.3 |
| 2011/0000056 | A1 | 1/2011 | Iwahara et al. | |
| 2012/0112017 | A1 * | 5/2012 | Siragusa | B60R 16/0215 248/74.3 |
| 2012/0217355 | A1 * | 8/2012 | Geiger | F16L 3/12 248/74.2 |
| 2012/0304422 | A1 | 12/2012 | Asai | |
| 2013/0009021 | A1 * | 1/2013 | Germ | H02G 3/263 248/74.3 |
| 2015/0102183 | A1 * | 4/2015 | Yamaguchi | B60R 16/0215 248/74.3 |
| 2018/0209464 | A1 * | 7/2018 | Sugimoto | F16B 21/065 |

FOREIGN PATENT DOCUMENTS

| | | |
|---|---|---|
| FR | 3016937 A1 | 7/2015 |
| JP | 2009299851 A | 12/2009 |
| JP | 2009299851 A1 | 12/2009 |
| JP | 2011027258 A | 2/2011 |
| JP | 2012253909 A | 12/2012 |

* cited by examiner

VEHICLE ATTACHMENT COMPONENT

RELATED APPLICATIONS

This application claims the priority of Japanese Patent Application No. 2016-206677 filed on Oct. 21, 2016. The disclosure of the prior application is hereby incorporated herein in the entirety by reference.

BACKGROUND OF THE INVENTION

Field of the Invention

This invention relates to a vehicle attachment component.

Description of Related Art

For a vehicle, a vehicle attachment component (Japanese Laid-Open Patent Publication No. 2012-253909) such as a clamp to be attached to an attachment target member on a vehicle side may be provided. Such an attachment component has, on a first side, an attachment portion to be attached to the attachment target member on the vehicle side, and has a function portion on a second side opposite to the first side. The function portion exerts a predetermined function when attached to the attachment target member. As the function portion, for example, a retention portion for tying and retaining a wire harness is known. As the attachment target member, for example, a plate-shaped panel material or an instrument panel reinforcement which is a cylindrical member is known.

The attachment portion of the conventional clamp has: a shaft portion to be inserted into an attachment hole of the attachment target member; an elastic engagement piece which expands from the distal end side toward the base end side of the shaft portion and always contacts with and presses the peripheral part of the attachment hole of the attachment target member from the back side (deep side in insertion direction); and a dish-shaped portion which expands in a dish shape (or skirt shape) from the base end side toward the distal end side of the shaft portion and contacts with the peripheral part of the attachment hole of the attachment target member from the front side (near side in insertion direction). Thus, the attachment portion is attached to the attachment target member so as to sandwich the thickness part of the peripheral part of the attachment hole between the elastic engagement piece and the dish-shaped portion.

However, in the case where the attachment target member is a longitudinal member elongated in a predetermined direction such as an instrument panel reinforcement, the dish-shaped portion of the clamp contacts with only both sides in the longitudinal direction of the tubular longitudinal member, but does not contact with the radial-direction sides thereof (i.e., in the direction perpendicular to both the longitudinal direction and the insertion direction into the attachment hole). Specifically, as shown in FIG. 12, in a conventional clamp 1000, on both sides in a radial direction 100Y of a longitudinal attachment target member 100, gaps 400 are present between the attachment target member 100 and a dish-shaped portion 200. Owing to the presence of the gaps 400, the clamp 1000 is allowed to tilt until the dish-shaped portion 200 comes into contact with the attachment target member 100. Therefore, if a wire harness 5 retained by a function portion 3 rocks in a radial direction 5Y due to vehicle vibration or the like, the clamp 1000 as a whole greatly tilts and rocks following the above rocking. At this time, rattling can occur by the attachment target member 100 and the dish-shaped portion 200 contacting with each other.

An object of this invention is to realize a vehicle attachment component that, when attached to a longitudinal member, suppresses tilting and rocking as a whole caused by vehicle vibration, to suppress rattling, and is adaptable to longitudinal members different in diameter and/or plate thickness.

SUMMARY OF THE INVENTION

In order to achieve the above object, a vehicle attachment component according to this invention includes: an attachment portion provided on a first side and configured to be attached to a predetermined longitudinal member; and a predetermined function portion provided on a second side opposite to the first side.

The attachment portion includes:

a detachment preventing engagement portion configured to be inserted into an attachment hole provided in the longitudinal member and thereby engaged with the longitudinal member from a deep side in an insertion direction thereof, to come into a detachment-prevented state; and elastic pressing portions having: base end portions protruding from a base end side in the insertion direction of the detachment preventing engagement portion toward both sides in a direction perpendicular to both the insertion direction and a longitudinal direction of the longitudinal member in the detachment-prevented state; and distal end portions bent at ends of the base end portions toward the deep side in the insertion direction and extending in an inclined manner so as to approach the longitudinal member, the distal end portions being configured to always elastically press an outer surface of the longitudinal member, the base end portions being thicker than the distal end portions.

In the above configuration, when attachment to the longitudinal member is made by the detachment preventing engagement portion, the elastic pressing portions extending toward both sides in a direction perpendicular to the longitudinal direction of the longitudinal member always contact with the outer surface of the longitudinal member and press the outer surface. This pressing continues even when tilting and rocking occur as a whole by vehicle vibration or the like. Therefore, rattling that could occur against the longitudinal member can be suppressed and tilting and rocking as a whole can be reduced.

In the above configuration, each elastic pressing portion has a two-stage-thickness stabilizer structure having a thick base end portion and a thin distal end portion. In this case, the thin distal end portions are parts that actively cause elastic deformation, and by bending, can effectively absorb a load from the function portion side or an external force (i.e., a load from the longitudinal member) applied by vehicle vibration. Even if a longitudinal member having a different outer diameter or plate thickness is used, as long as the difference is within a certain range, the thin distal end portions can always keep in contact with each of the outer circumferential surfaces of such various longitudinal members by elastic deformation of themselves. That is, even if a longitudinal member having a different outer diameter or plate thickness is used, the thin distal end portions can cancel the difference by change in the bending amounts of themselves, and thus there is an advantage that it is possible to adapt to longitudinal members having various outer diameters or plate thicknesses. On the other hand, the thick base end portions have a high rigidity so that, even if the predetermined function portion retains a heavy object, the thick base end portions contribute to reliable support for the weight thereof. In addition, for example, in the case where the predetermined function portion tilts and rocks in a direction perpendicular to the longitudinal member, the thick base end portions function also as movement regulation portions for regulating movement of the predetermined function portion at a position where the thick base end portions contact with the predetermined function portion. Therefore, tilting and rocking of the vehicle attachment component as a whole can be reduced.

In the above configuration, at ends in the extending direction of the base end portions, the distal end portions are bent toward the outer circumferential surface side of the longitudinal member in the detachment-prevented state, thus forming a bent shape. Therefore, it becomes possible to adapt also to a longitudinal member having a smaller outer diameter.

Each of the elastic pressing portions may have, between the distal end portion and the base end portion, a thickness change portion having a thickness decreasing from the base end portion side toward the distal end portion side, and the thickness change portion and the distal end portion may be formed such that an outer surface at a connection position therebetween has a recessed shape. For example, the thickness change portion of the elastic pressing portion may have such a shape that causes sharp thickness change within a short section, instead of having such a shape in which the distal end portion and the base end portion are smoothly continuous with each other. Thus, the outer surface of the thickness change portion becomes an inclined surface that connects the outer surface of the base end portion and the outer surface of the distal end portion discontinuously, and a recessed portion can be formed on the distal end portion side thereof. By thus forming a recessed portion, the recessed portion is used as a fulcrum for the distal end portion to bend. That is, a fulcrum for the distal end portion to bend can be intentionally set using the recessed portion. In the elastic pressing portions, the distal end portions for suppressing rattling and the base end portions for supporting a load and regulating tilting serve different roles respectively, and by adjusting the positions of the recessed portions in manufacturing, it is possible to easily design vehicle attachment components different in the outer diameter range and the plate thickness range of longitudinal members in which rattling can be suppressed, and different in the range of loads that can be supported.

The elastic pressing portions may be configured such that, in the detachment-prevented state, the base end portions are not in contact with the longitudinal member and the distal end portions elastically press the longitudinal member, and when each elastic pressing portion is subjected to a further pressing force from the longitudinal member, the base end portion (in particular, the distal end side thereof) which has been in a non-contact state comes close to or into contact with the longitudinal member. For example, in the case where the predetermined function portion is a retention portion for a wire harness arranged in parallel to the longitudinal member, there is a possibility that the wire harness which is a heavy object tilts and rocks in a direction perpendicular to the longitudinal direction thereof by vehicle vibration or the like. At this time, the vehicle attachment component as a whole tilts and rocks with respect to the longitudinal member, together with the wire harness which is a heavy object. At this time, the longitudinal member approaches the elastic pressing portion on one side and applies a great load to the elastic pressing portion on the approaching side. However, since the base end portion is made thick, it is possible to reliably receive and support the great load. Further, since also the base end portion is an elastically deformable portion, the base end portion can absorb a part of the great load by the distal end side thereof bending even slightly. In addition, when the longitudinal member is approaching the elastic pressing portion on one side, this approach is limited up to a contact position with the base end portion of the elastic pressing portion. Therefore, it is possible to prevent excessive tilting and rocking of the vehicle attachment component as a whole.

DESCRIPTION OF THE PREFERRED EMBODIMENTS

Figure 1:
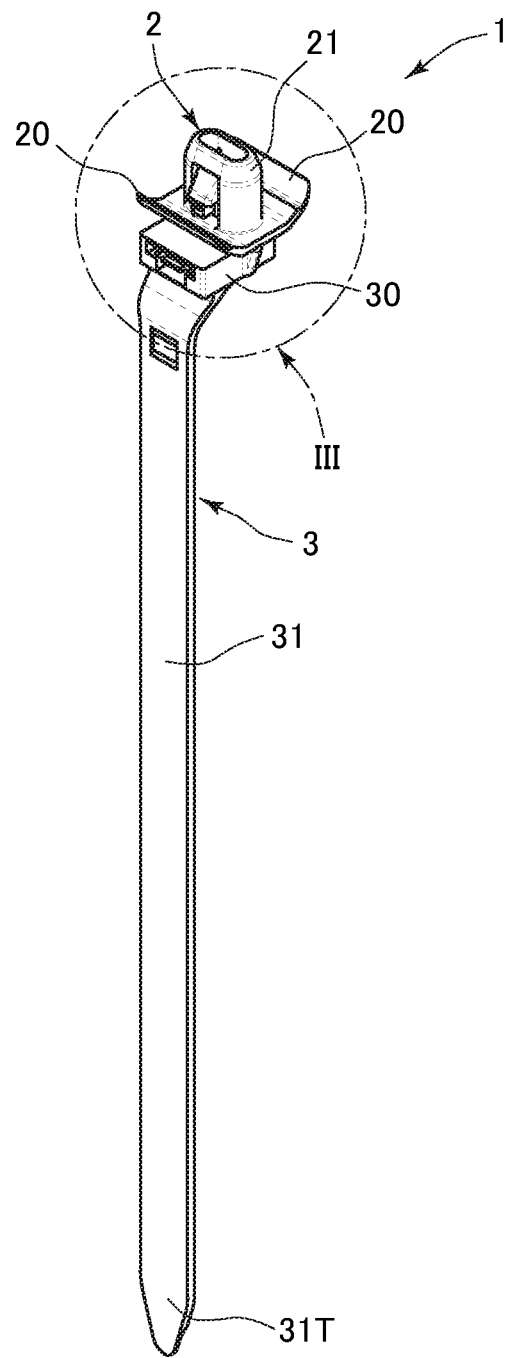
FIG. 1 is a perspective view showing a vehicle attachment component according to one embodiment of this invention.
Figure 2:
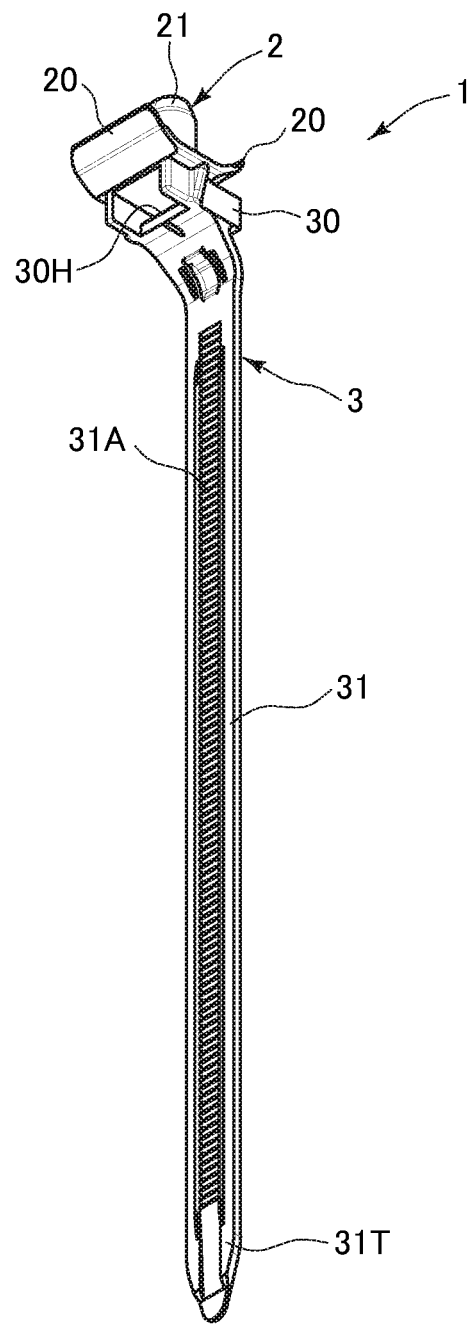
FIG. 2 is a perspective view of the vehicle attachment component in FIG. 1 as seen from a direction different from that in FIG. 1.
Figure 3:
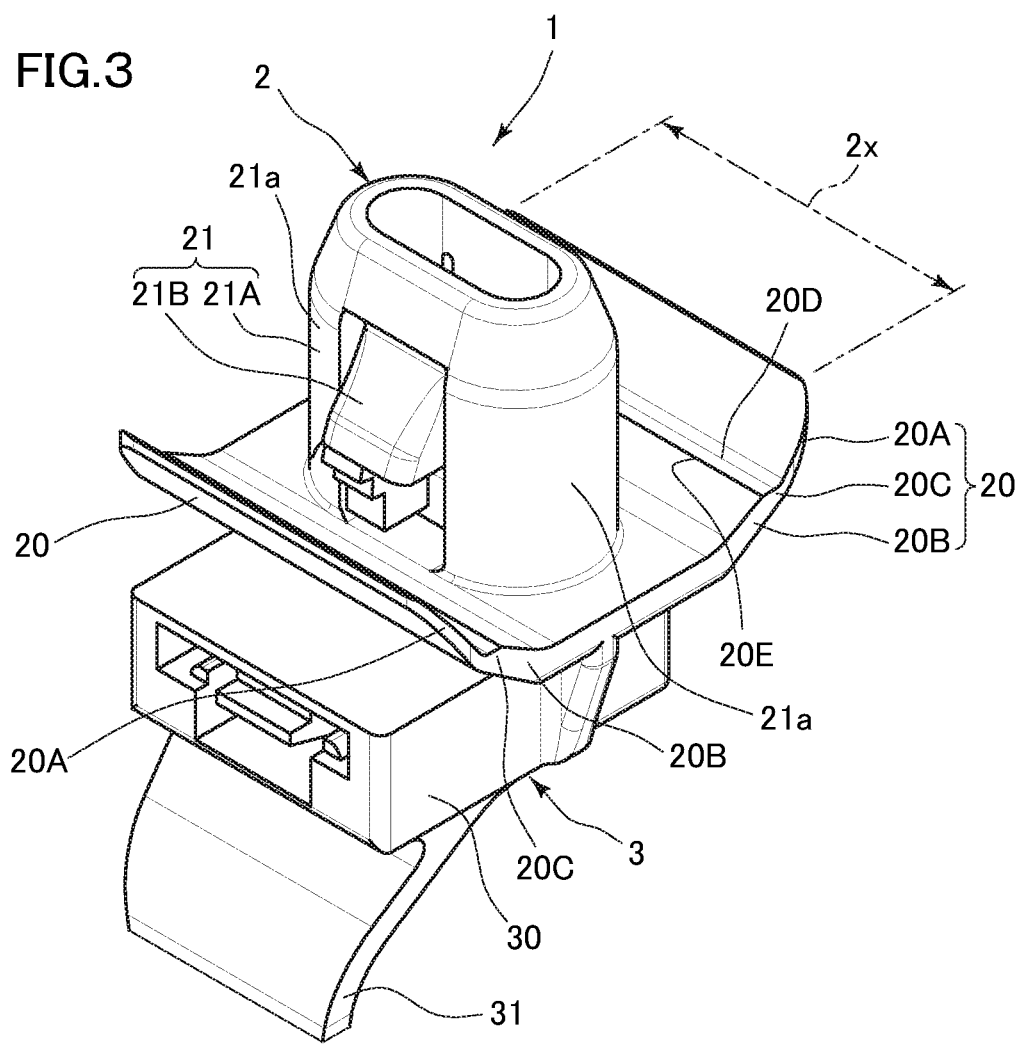
FIG. 3 is an enlarged view of part III in FIG. 1.
Figure 4:
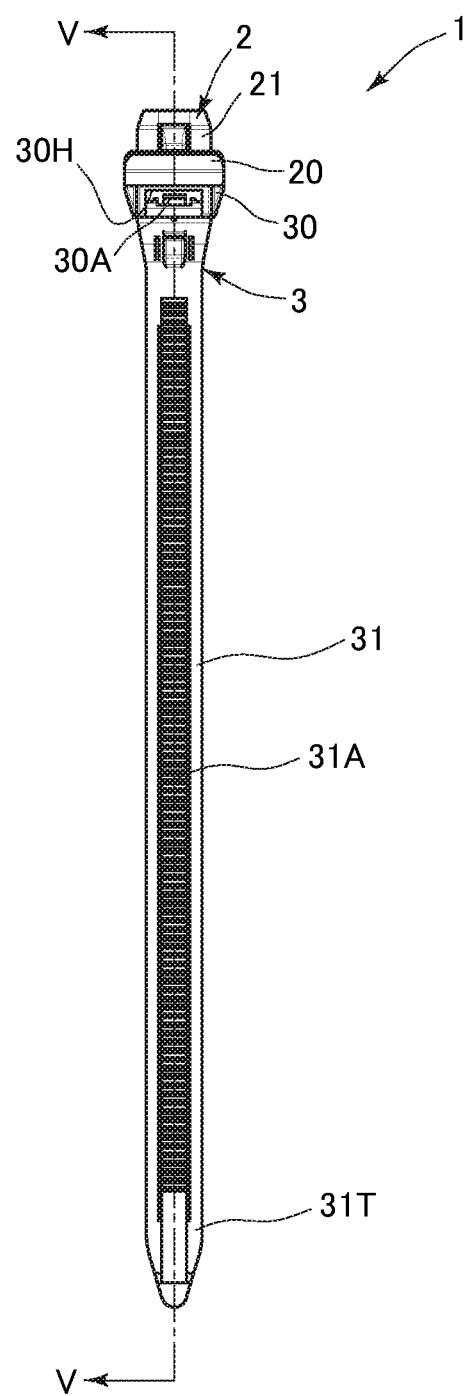
FIG. 4 is a back view of the vehicle attachment component in FIG. 1.
Figure 5:
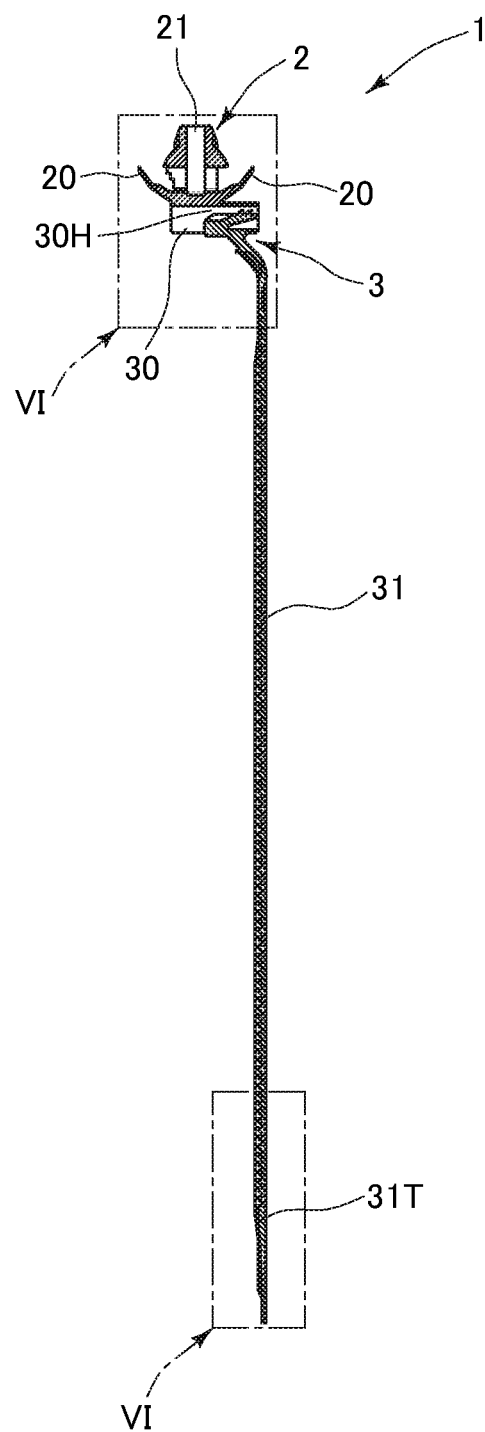
FIG. 5 is a V-V sectional view of FIG. 4.

Hereinafter, embodiments of this invention will be described with reference to examples shown in the drawings.

A vehicle attachment component 1 shown in FIG. 1 to FIG. 6 is a vehicle component to be attached to a longitudinal member which is provided to a vehicle and elongated in a predetermined direction. The longitudinal member here is an instrument panel reinforcement 100 (see FIG. 7) which is a tubular member. The vehicle attachment component 1 has, on a first side, an attachment portion 2 to be attached to the instrument panel reinforcement 100, and has, on a second side opposite to the first side, a wire harness retention portion 3 (hereinafter, referred to as a retention portion 3) as a predetermined function portion having a predetermined function. That is, the vehicle attachment component 1 according to this embodiment can be also referred to as a clamp for instrument panel reinforcement, a wire harness clamp, or the like.

Figure 8:
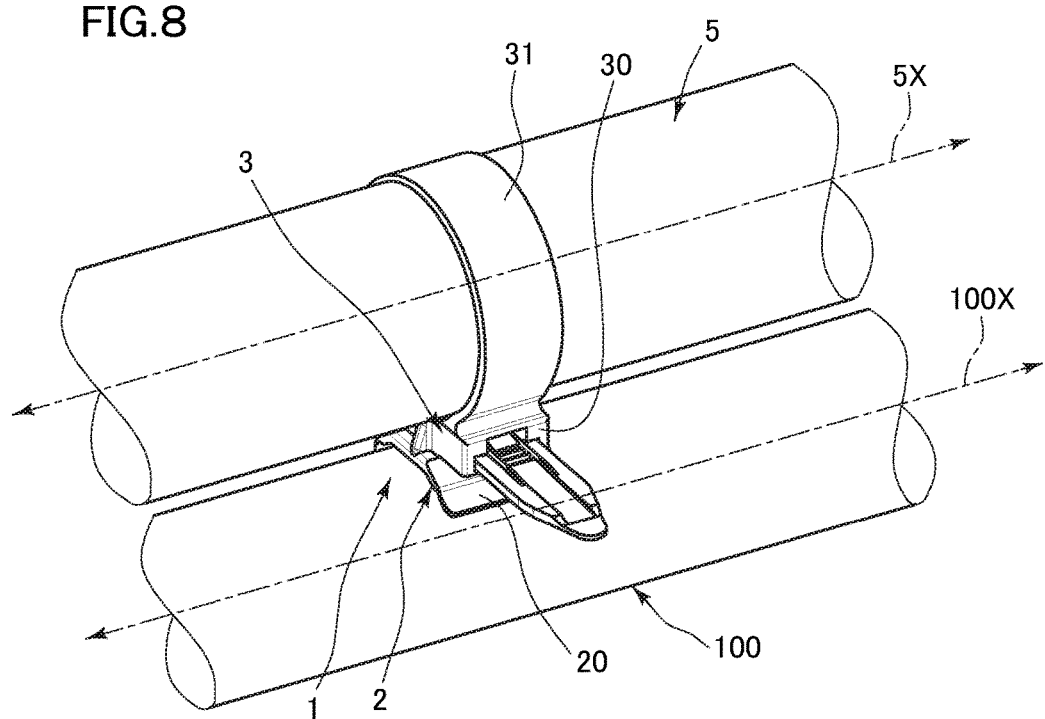
FIG. 8 is a perspective view showing an attachment state in which the vehicle attachment component in FIG. 1 is attached to the instrument panel reinforcement in FIG. 7.

The retention portion 3 is a function portion for tying and retaining the wire harness 5 (see FIG. 8: which here can be also said to be an instrument panel wire harness). The retention portion 3 here has a belt portion 31 for tying the wire harness 5, and a belt storing portion 30 which stores the belt portion 31 from an end 31T side to bring the belt portion 31 into a detachment-prevented state. The belt storing portion 30 is integrated with the belt portion 31, and the end 31T of the belt portion 31 is stored into the belt storing portion 30 through an opening 30H thereof. A belt engagement portion 30A (see FIG. 4) is provided inside the belt storing portion 30, and is to be engaged with an engagement receiving portion 31A of the belt portion 31 stored in the belt storing portion 30. Thus, the belt portion 31 stored in the belt storing portion 30 is retained in a detachment-prevented state (see FIG. 9) so as to be prevented from being detached in a direction opposite to the storing direction. It is noted that an engagement structure for preventing detachment of the belt portion 31 inside the belt storing portion 30 is well known, and therefore further detailed description thereof is omitted.

Figure 6:
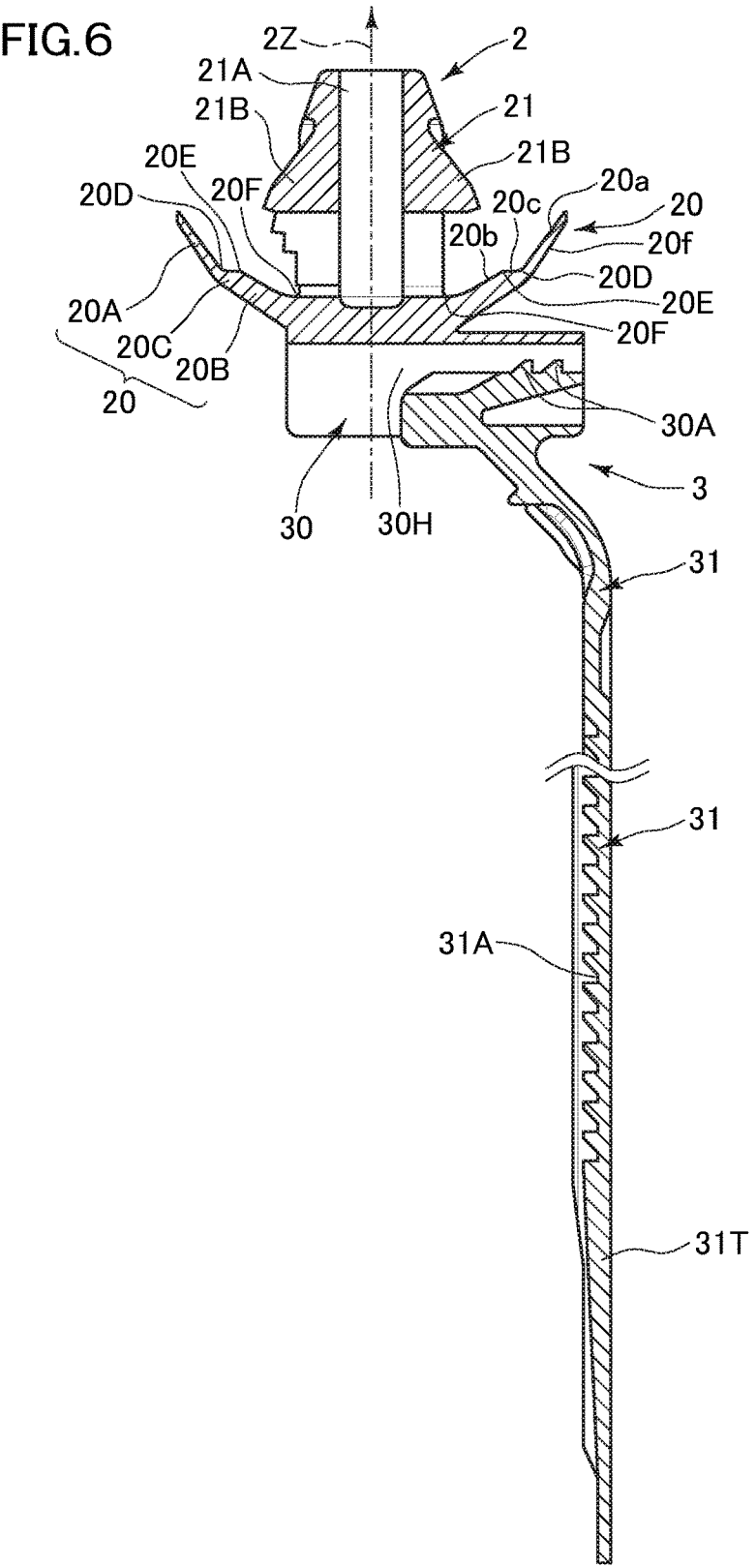
FIG. 6 is an enlarged view of parts VI at two upper and lower locations in FIG. 5.
Figure 7:
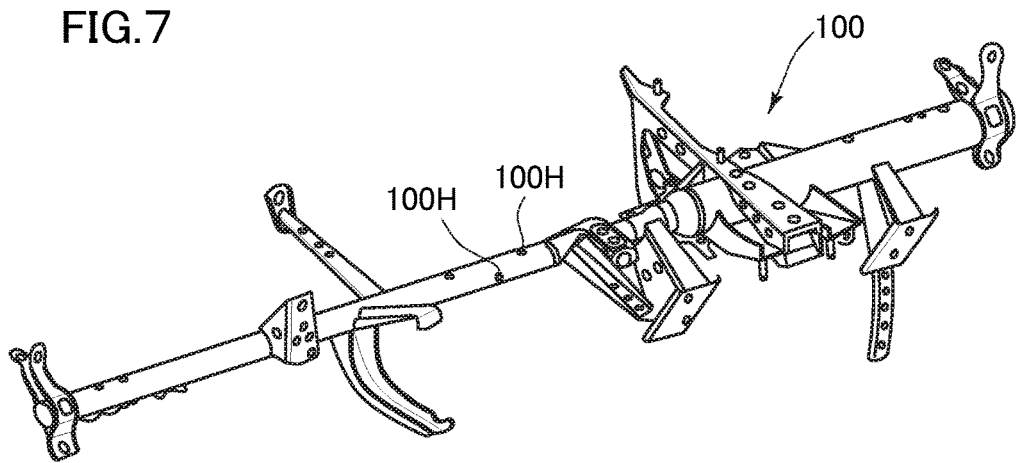
FIG. 7 is a perspective view showing an instrument panel reinforcement which is an example of a target to which the vehicle attachment component in FIG. 1 is to be attached.
Figure 9:
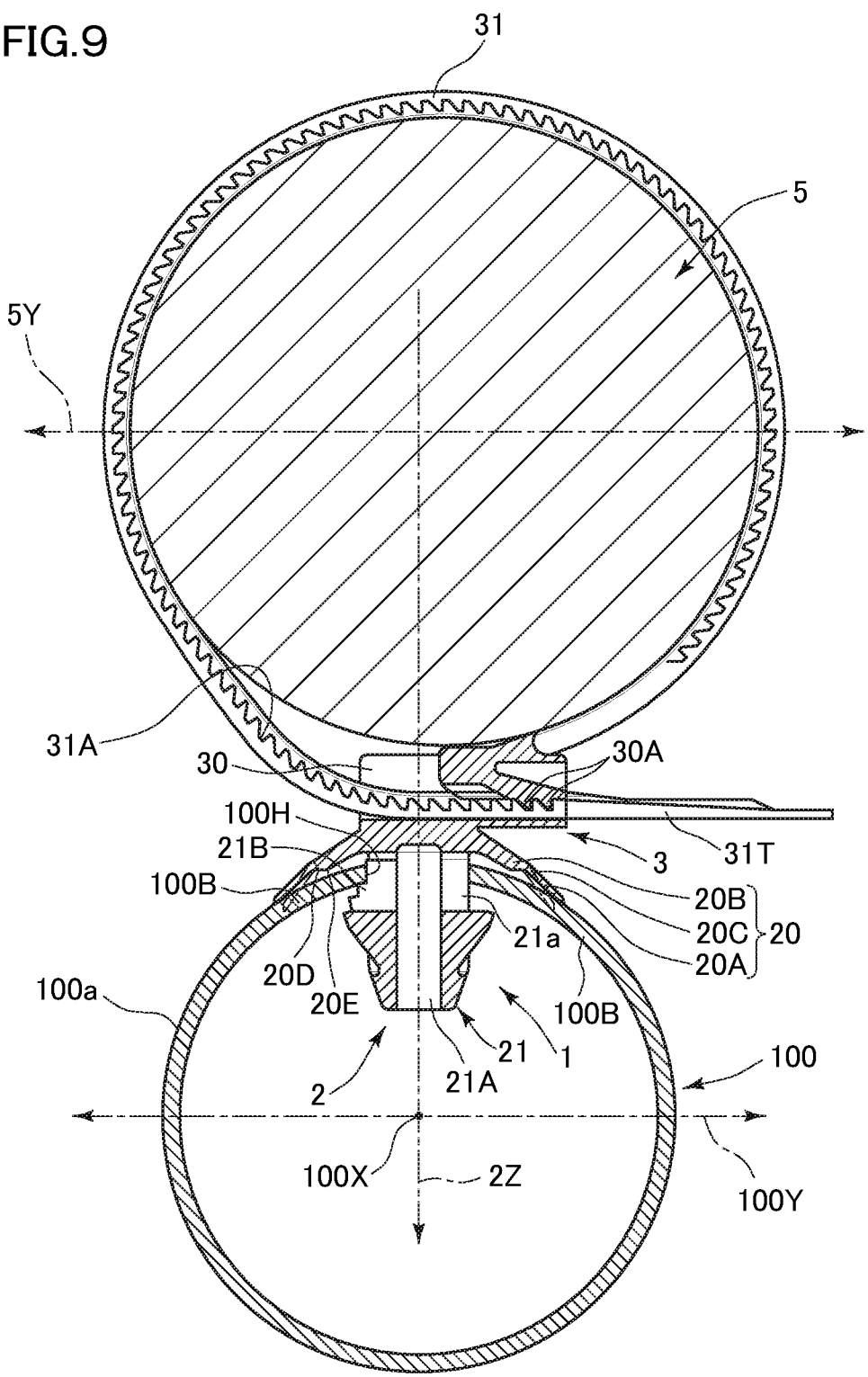
FIG. 9 is a sectional view showing the attachment state in FIG. 8.

As shown in FIG. 6 and FIG. 9, the attachment portion 2 has: a detachment preventing engagement portion 21 which is inserted into an attachment hole 100H (see FIG. 7) provided in the instrument panel reinforcement 100 and thereby engaged with the instrument panel reinforcement 100 from the inner side thereof (i.e., deep side in insertion direction 2Z) to come into a detachment-prevented state; and elastic pressing portions 20 which protrude from the base end side in an insertion direction 2Z of the detachment preventing engagement portion 21 toward both sides in a direction 100Y perpendicular to a longitudinal direction 100X of the instrument panel reinforcement 100 in a detachment-prevented state and always elastically press the instrument panel reinforcement 100 from the outer side thereof (i.e., near side in insertion direction 2Z), on the distal end sides of the elastic pressing portions 20.

Since the attachment portion 2 has such a structure that the elastic pressing portions 20 protrude toward both sides in the perpendicular direction 100Y and always press the instrument panel reinforcement 100 on both sides, the longitudinal direction 100X of the instrument panel reinforcement 100 to which the vehicle attachment component 1 has been attached in the detachment-prevented state is always constant with respect to the vehicle attachment component 1. Meanwhile, in the retention portion 3, since the direction in which the belt portion 31 is stored into the belt storing portion 30 is determined, a longitudinal direction 5X of the wire harness 5 tied and retained by the belt portion 31 is also always constant with respect to the vehicle attachment component 1. Here, as shown in FIG. 8, the instrument panel reinforcement 100 is attached to the attachment portion 2 of the vehicle attachment component 1 and the wire harness 5 is retained by the retention portion 3 of the vehicle attachment component 1, such that the longitudinal direction 5X of the wire harness 5 and the longitudinal direction 100X of the instrument panel reinforcement 100 are parallel to each other at least around the vehicle attachment component 1.

As shown in FIG. 6, the detachment preventing engagement portion 21 has: a shaft portion 21A protruding toward the first side; and elastic locking pieces 21B which are formed on both sides with respect to the shaft portion 21A and are capable of elastically deforming in a direction to approach the shaft portion 21A. In a state in which the elastic locking pieces 21B are elastically deformed to be close to the shaft portion 21A, the detachment preventing engagement portion 21 is inserted into the attachment hole 100H of the instrument panel reinforcement 100 from the outer side thereof, and after the insertion, the elastic locking pieces 21B are elastically restored to be separated from the shaft portion 21A. Thus, as shown in FIG. 9, the detachment preventing engagement portion 21 comes into a detachment-prevented state in which the detachment preventing engagement portion 21 contacts with a peripheral portion 100B of the attachment hole 100H of the tubular instrument panel reinforcement 100 from the inner side of the instrument panel reinforcement 100.

As shown in FIG. 9, each elastic pressing portion 20 extends from the base end side in the insertion direction 2Z of the detachment preventing engagement portion 21 in an inclined manner with respect to the axial direction of the shaft portion 21A so as to approach an outer circumferential surface 100a of the instrument panel reinforcement 100, and thus is formed so as to always elastically press the outer circumferential surface 100a on the distal end side of the elastic pressing portion 20. Each elastic pressing portion 20 has a distal end portion 20A and a base end portion 20B thicker than the distal end portion 20A, and is formed in a bent shape in which, at an end in the extending direction of the base end portion 20B, the distal end portion 20A is bent toward the outer circumferential surface 100a side (i.e., deep side in insertion direction 2Z) of the instrument panel reinforcement 100 in a detachment-prevented state. Thus, it is possible to adapt to both the instrument panel reinforcement 100 (see FIG. 10) having a small outer diameter and the instrument panel reinforcement 100 (see FIG. 11) having a large outer diameter, and in addition, adapt to both the instrument panel reinforcement 100 (see left side in FIG. 10 and FIG. 11) having a great plate thickness and the instrument panel reinforcement 100 (see right side in FIG. 10 and FIG. 11) having a small plate thickness.

As described above, the vehicle attachment component 1 is attached to the tubular instrument panel reinforcement 100 so as to always sandwich the thickness part thereof between the elastic pressing portions 20 pressing the outer circumferential surface 100a of the instrument panel reinforcement 100 from the outer side and the detachment preventing engagement portion 21 contacting with the inner circumferential surface of the instrument panel reinforcement 100 from the inner side, and thus comes into a detachment-prevented state.

Figure 12:
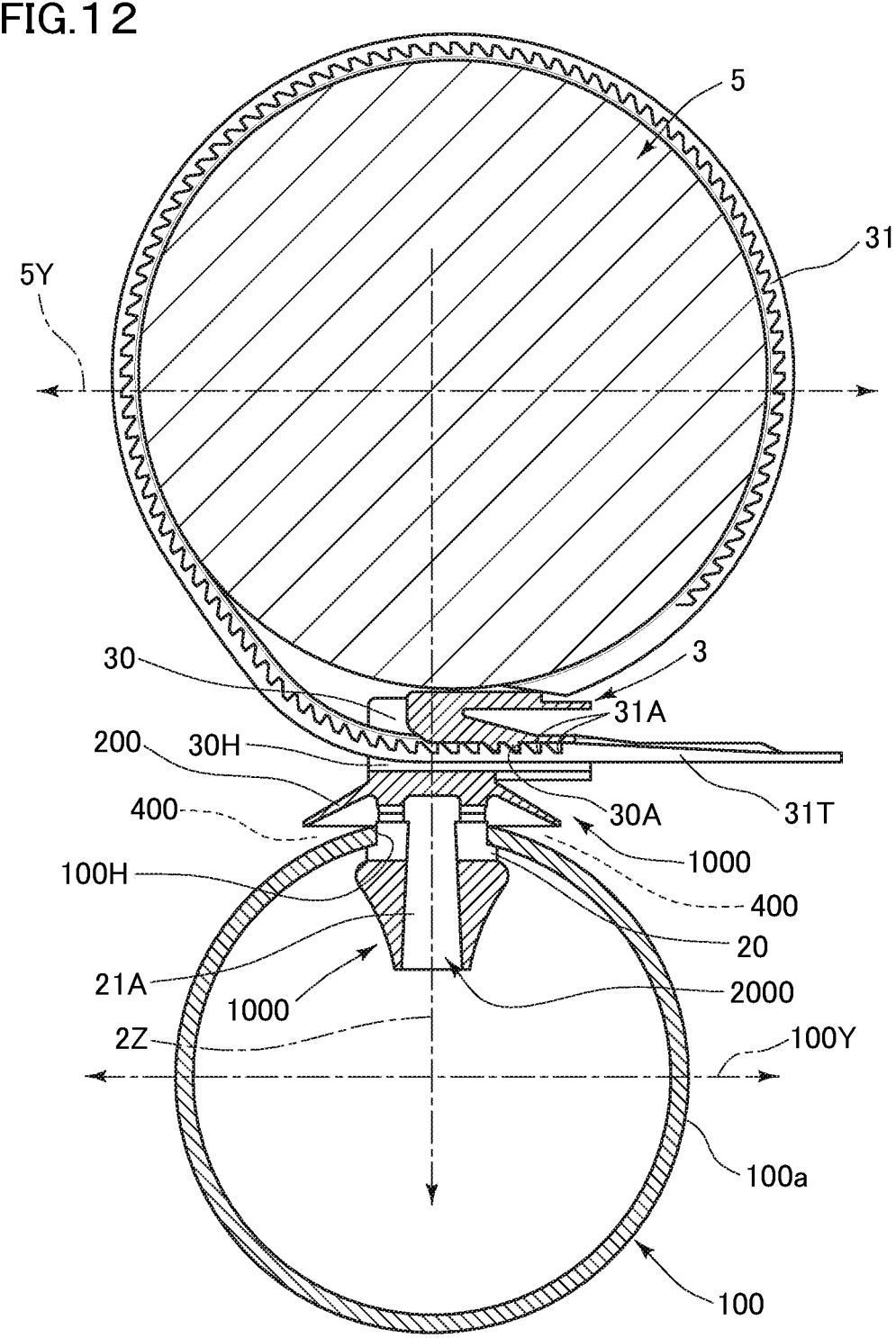
FIG. 12 is a sectional view showing an attached state in which a conventional vehicle attachment component is attached to an instrument panel reinforcement.

In contrast, a conventional vehicle attachment component 1000 is different mainly in the shape of an elastic pressing portion 200 of an attachment portion 2000, as shown in FIG. 12. It is noted that, in the vehicle attachment component 1000 in FIG. 12, parts having the same functions as those in the vehicle attachment component 1 of this embodiment are denoted by the same reference characters. The dish-shaped portion 200 (part corresponding to the elastic pressing portions 20 of this embodiment) of the vehicle attachment component 1000 in FIG. 12 is an annular portion having a dish shape (or skirt shape) expanding outward from the base end side toward the distal end side of a shaft portion 21A. In a vertical sectional view of the wire harness 5 and the instrument panel reinforcement 100 as shown in FIG. 12, the dish-shaped portion 200 is not in contact with the instrument panel reinforcement 100, and gaps 400 are present between the dish-shaped portion 200 and the instrument panel reinforcement 100. Therefore, the vehicle attachment component 1000 can tilt until the elastic pressing portion 200 contacts with the instrument panel reinforcement 100, and comparatively great rocking can occur due to vehicle vibration. However, in the vehicle attachment component 1 of this embodiment, as shown in FIG. 9, the elastic pressing portions 20 always press the outer circumferential surface 100a of the instrument panel reinforcement 100, and the instrument panel reinforcement 100 is always sandwiched between the elastic pressing portions 20 and the detachment preventing engagement portion 21. Therefore, rattling between the vehicle attachment component 1 and the instrument panel reinforcement 100 is greatly suppressed as compared to the conventional case.

As shown in FIG. 6, the elastic pressing portions 20 have two-stage-thickness structures having the thin distal end portions 20A and the thick base end portions 20B. As shown in FIG. 9, the thin distal end portions 20A extend so as to wrap the outer circumferential surface 100a of the instrument panel reinforcement 100 and always press the outer circumferential surface 100a, thereby serving a function of preventing rattling caused at the time of vehicle vibration. On the other hand, the thick base end portions 20B have a higher rigidity than the thin distal end portions 20A, thereby serving a function of withstanding a load applied at the time of vehicle vibration.

In the elastic pressing portions 20, as shown in FIG. 9, in a detachment-prevented state, the base end portions 20B are not in contact with the instrument panel reinforcement 100 and the distal end portions 20A elastically press the instrument panel reinforcement 100. However, when each elastic pressing portion 20 is subjected to a further pressing force from the instrument panel reinforcement 100 due to an external force such as vehicle vibration, the base end portion 20B which has been in a non-contact state comes close to or into contact with the instrument panel reinforcement 100. The base end portion 20B which has come into contact with the instrument panel reinforcement 100 regulates further movement of the instrument panel reinforcement 100 by the rigidity thereof, thereby serving a function as a movement regulation portion.

Each elastic pressing portion 20 is formed as an elastic piece having a rectangular plate shape and having a predetermined width 2x (see FIG. 3) in the longitudinal direction 100X, with respect to the instrument panel reinforcement 100 in a detachment-prevented state. The predetermined width 2x here is set to be longer than the width of the shaft portion 21A in the longitudinal direction 100X. Thus, the base end portion 20B of each elastic pressing portion 20 has such a shape as to expand also in the longitudinal direction 100X with respect to the shaft portion 21A, whereby the contact area with the instrument panel reinforcement 100 on the distal end portion 20A side is ensured to be wide in the longitudinal direction 100X.

As shown in FIG. 6, each elastic pressing portion 20 has, between the distal end portion 20A and the base end portion 20B, a thickness change portion 20C having a thickness decreasing from the base end portion 20B side toward the distal end portion 20A side. The thickness change portion 20C is formed as a section shorter than half, or further, one third the length of each of the distal end portion 20A and the base end portion 20B, in the length direction of the elastic pressing portion 20. Via such a short section, the distal end portion 20A and the base end portion 20B having different thicknesses are connected.

As shown in FIG. 6, each thickness change portion 20C has a recessed portion 20D recessed in an outer surface thereof at a connection position with the distal end portion 20A. The recessed portion 20D here is formed in the surface on the instrument panel reinforcement 100 side. Specifically, outer surfaces 20a, 20c, 20b of each elastic pressing portion 20 on the instrument panel reinforcement 100 side are connected such that the outer surface 20c of the thickness change portion 20C has a downward slope with respect to the outer surface 20b of the base end portion 20B (i.e., the outer surface 20c has a downward slope with respect to the outer surface 20b when the outer surface 20b is viewed in the horizontal direction), a projecting portion 20E is formed at a position where the base end portion 20B changes to the thickness change portion 20C, the outer surface 20a of the distal end portion 20A has an upward slope with respect to the outer surface 20c of the thickness change portion 20C (i.e., the outer surface 20a has an upward slope with respect to the outer surface 20c when the outer surface 20c is viewed in the horizontal direction), and the recessed portion 20D is formed at a position where the thickness change portion 20C changes to the distal end portion 20A. On the other hand, the slope of an outer surface 20f of the elastic pressing portion 20 on a side opposite to the instrument panel reinforcement 100 does not change as sharply as those of the outer surfaces 20a, 20c, 20b on the instrument panel reinforcement 100 side. Thus, although the outer surface 20f has a slight slope change at a position where the base end portion 20B changes to the thickness change portion 20C, the outer surface 20f is a surface that continues smoothly as a whole.

As described above, the outer surface 20c of the thickness change portion 20C is a sloped surface that connects the outer surface 20b of the base end portion 20B and the outer surface 20a of the distal end portion 20A discontinuously, and has the recessed portion on the distal end portion 20A side, whereby the recessed portion 20D serves a function as a bending fulcrum for the distal end portion 20A to deform and bend with respect to the base end portion 202 having a high rigidity.

Figure 10:
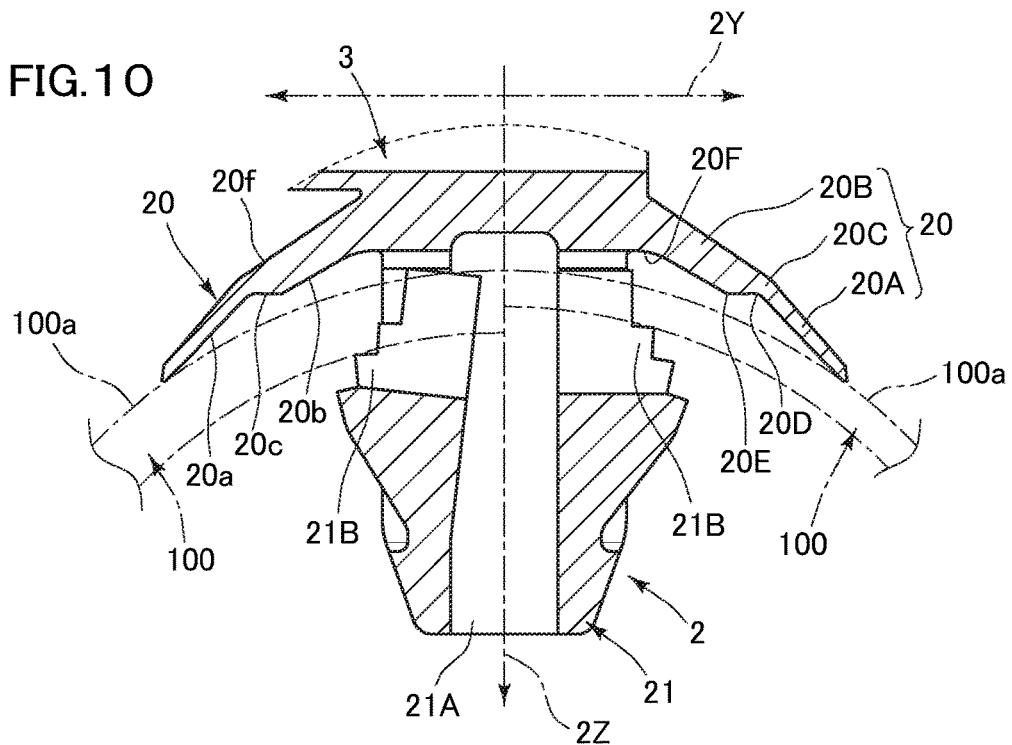
FIG. 10 is an enlarged sectional view of an attachment portion in FIG. 9 in the case of being attached to an instrument panel reinforcement having a different plate thickness.
Figure 11:
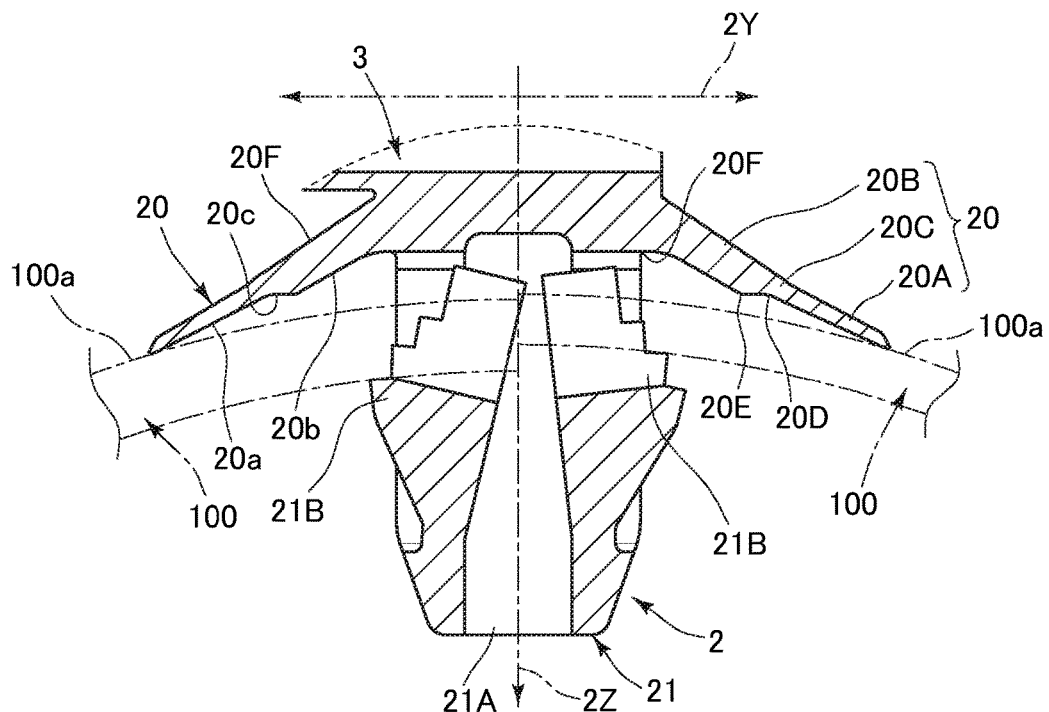
FIG. 11 is an enlarged sectional view of the attachment portion in FIG. 9 in the case of being attached to an instrument panel reinforcement having an outer diameter different from that in FIG. 10.

As shown in FIG. 10 and FIG. 11, each projecting portion 20E is a corner portion formed in a bent shape on the outer surface at a position where the thickness change portion 20C and the base end portion 20B are connected. The projecting portion 20E is formed as a part that will first contact with the instrument panel reinforcement 100 on the base end side of the elastic pressing portion 20 excluding the distal end portion 20A, when the distal end portion 20A is elastically deformed further greatly by the instrument panel reinforcement 100. Specifically, the outer surface 20c of the thickness change portion 20C here is formed as a surface facing the instrument panel reinforcement 100, and is formed so as to substantially coincide with a plane perpendicular to the axial direction of the shaft portion 21A (i.e., insertion direction 2Z of detachment preventing engagement portion 21), and the projecting portion 20E is a corner portion on the base end portion 20B side of the outer surface 20c. In this case, when a great load is applied from the instrument panel reinforcement 100, the instrument panel reinforcement 100 comes into contact with, of the base end portion 20B, the projecting portion 20E first, and thus presses the projecting portion 20E and the distal end portion 20A with which the instrument panel reinforcement 100 has already contacted, at the same time. As a result, a load is applied to the distal end side of the base end portion 20B of the elastic pressing portion 20, and the base end portion 20B deforms to bend with its base end 20F (i.e., a part connected to the shaft portion 21A) as a fulcrum. Therefore, when a further great pressing force is applied from the instrument panel reinforcement 100, the pressing force is absorbed not only by elastic deformation occurring in the distal end portion 20A but also by elastic deformation occurring on the base end portion 20B side, whereby the instrument panel reinforcement 100 can be effectively supported. The great load from the instrument panel reinforcement 100 is not applied to the entire elastic pressing portion 20 via the distal end portion 20A, but a part of the load is received via the projecting portion 20E by the base end portion 20B so that the great load is applied to the entire elastic pressing portion 20 including the distal end portion 20A and the base end portion 20B. Therefore, an excessive load is not applied to the distal end portion 20A.

The shaft portion 21A has rotation preventing portions 21a (see FIG. 3 and FIG. 9) so as not to rotate around the axial direction (i.e., insertion direction 2Z of detachment preventing engagement portion 21) with respect to the attachment hole 100H provided to the instrument panel reinforcement 100. The shaft portion 21A here has a tubular shape having an oval-shaped outer circumferential surface elongated in the longitudinal direction 100X of the instrument panel reinforcement 100. Therefore, both end portions in the longitudinal direction 100X of the shaft portion 21A function as the rotation preventing portions 21a with respect to the attachment hole 100H formed in the corresponding shape. Thus, the vehicle attachment component 1 prescribes the wiring direction (here, parallel to the wire harness 5) of the wire harness 5 retained by the vehicle attachment component 1, with respect to the instrument panel reinforcement 100 which is an attachment target member.

Although the embodiments of this invention have been described above, the embodiments are merely illustrative, this invention is not limited thereto, and various modifications such as additions and omissions may be made on the basis of the knowledge of a person skilled in the art without departing from the scope of the claims.

Hereinafter, other embodiments different from the above embodiment, and modifications, will be described. It is noted that parts having the same functions as those in the above embodiment are denoted by the same reference characters, and the detailed description thereof is omitted. The above embodiment and the following modifications may be combined to be implemented as appropriate as long as no technical contradiction arises.

In the above embodiment, the retention portion 3 for retaining the wire harness 5 is provided on the second side of the vehicle attachment component 1. However, a function portion serving another predetermined function, e.g., a connector connection portion to be connected to a counterpart connector, may be provided.

In the above embodiment, the retention portion 3 has the belt storing portion 30 and the belt portion 31 integrated with each other. However, they may be separate from each other. For example, the following tying structure may be adopted: in a state in which a belt is passed through the belt storing portion, the belt is wound around the outer circumference of the wire harness 5, and the loop-shaped wound belt is fixed by a belt fixing portion provided integrally with or separately from the belt.

In the above embodiment, a target to which the vehicle attachment component 1 is attached is the instrument panel reinforcement 100. However, the attachment target may be another tubular member or longitudinal member.

In the above embodiment, the elastic locking pieces 21B are formed on both sides in the direction 100Y perpendicular to the longitudinal direction 100X of the instrument panel reinforcement 100, and are provided such that the positions at which the elastic locking pieces 21B contact with the instrument panel reinforcement 100 are further close to the positions at which the elastic pressing portions 20 contact with the instrument panel reinforcement 100, whereby the instrument panel reinforcement 100 is further reliably held therebetween. However, the elastic locking pieces 21B may be formed at positions different from those in the above embodiment.

In the above embodiment, the vehicle attachment component 1 is attached to the instrument panel reinforcement 100 such that the retention portion 3 is positioned above the attachment portion 2. However, the vehicle attachment component 1 may be attached to the instrument panel reinforcement 100 or another longitudinal member such that the retention portion 3 and the attachment portion 2 have a positional relationship different from that described above.

DESCRIPTION OF THE REFERENCE CHARACTERS 1 vehicle attachment component
2 attachment portion
20 elastic pressing portion
20A distal end portion
20B base end portion
200 thickness change portion
21 detachment preventing engagement portion
3 retention portion (predetermined function portion)
30 belt storing portion
31 belt portion
5 wire harness
100 instrument panel reinforcement (longitudinal member)
100H attachment hole

What is claimed is:
1. A vehicle attachment component comprising:
an attachment portion provided on a first side and configured to be attached to a predetermined longitudinal member; and
a predetermined function portion provided on a second side opposite to the first side, wherein
the attachment portion includes:
a detachment preventing engagement portion configured to be inserted into an attachment hole provided in the longitudinal member and thereby engaged with the longitudinal member from a back side in an insertion direction thereof, to come into a detachment-prevented state; and
elastic pressing portions having: base end portions protruding from a base end side in the insertion direction of the detachment preventing engagement portion toward both sides in a direction perpendicular to both the insertion direction and a longitudinal direction of the longitudinal member in the detachment-prevented state; and distal end portions bent at ends of the base end portions and extending in an inclined manner so as to approach the longitudinal member, the distal end portions being configured to always elastically press an outer surface of the longitudinal member, the base end portions being thicker than the distal end portions,
wherein the longitudinal member is cylindrical member,
wherein the elastic pressing portions is formed as an elastic piece having a rectangular plate shape and having a predetermined width in the longitudinal direction with respect to the longitudinal member in a detachment-prevented state,
wherein each of the elastic pressing portions has, between the base end portion and the distal end portion, a thickness change portion having a thickness decreasing from the base end portion side toward the distal end portion side, and in the front view of the elastic pressing portions with the detachment preventing engagement portion on the upper side, each of outer surfaces of the base end portion and the distal end portion of the elastic pressing portions is a sloped surface having upward slope from the base end portion side to the distal end portion side among the outer surface on the longitudinal member side of the elastic pressing portions, and the slope of the outer surface of the distal end portion is set to be larger than the slope of the outer surface of the base end portion so that the distal end portion is further closer to the longitudinal member than the base end portion, and an outer surface of the thickness change portion connected to each of outer surfaces of the base end portion and the distal end portion is a substantially horizontal surface, and a ridge-shaped projecting portion is formed at a position where the base end portion changes to the thickness change portion, and a recessed portion is formed at a position where the thickness change portion changes to the distal end portion, wherein the elastic pressing portions are configured such that, in the detachment-prevented state, the base end portions and the thickness change portion are not in contact with the longitudinal member and the distal end portions elastically press the longitudinal member, and when each elastic pressing portion is subjected to a further pressing force from the longitudinal member, the projecting portion of the thickness change portion has been in a non-contact is made contactable with the longitudinal member.

2. The vehicle attachment component according to claim 1, wherein the detachment preventing engagement portion has: a shaft portion protruding toward the first side; and elastic locking pieces which are formed on both sides with respect to the shaft portion and are capable of elastically deforming in a direction to approach the shaft portion, the shaft portion having an oval-shaped outer circumferential surface elongated in the longitudinal direction of the longitudinal member has rotation preventing portions so as not to rotate around the axial direction of detachment preventing engagement portion with respect to the attachment hole provided to the longitudinal member.

3. The vehicle attachment component according to claim 2, wherein the predetermined width is set to be longer than the width of the shaft portion in the longitudinal direction.

* * * * *